(12) United States Patent
Kawabata

(10) Patent No.: US 11,216,569 B2
(45) Date of Patent: Jan. 4, 2022

(54) DATA MASKING SYSTEM

(71) Applicant: PROSPER CREATIVE CO., LTD., Tokyo (JP)

(72) Inventor: Hideki Kawabata, Tokyo (JP)

(73) Assignee: PROSPER CREATIVE CO., LTD., Tokyo (JP)

(*) Notice: Subject to any disclaimer, the term of this patent is extended or adjusted under 35 U.S.C. 154(b) by 416 days.

(21) Appl. No.: 16/314,244

(22) PCT Filed: Jun. 29, 2017

(86) PCT No.: PCT/JP2017/024060
§ 371 (c)(1),
(2) Date: Dec. 28, 2018

(87) PCT Pub. No.: WO2018/003953
PCT Pub. Date: Jan. 4, 2018

(65) Prior Publication Data
US 2019/0272384 A1  Sep. 5, 2019

(30) Foreign Application Priority Data

Jun. 29, 2016  (JP) .............................. JP2016-128398

(51) Int. Cl.
*G06F 21/62* (2013.01)
*G06F 21/30* (2013.01)
(Continued)

(52) U.S. Cl.
CPC .......... *G06F 21/6209* (2013.01); *G06F 16/00* (2019.01); *G06F 21/10* (2013.01); *G06F 21/30* (2013.01); *G06F 21/60* (2013.01); *G09C 1/00* (2013.01); *H04L 9/0861* (2013.01); *H04L 9/0891* (2013.01); *H04L 9/16* (2013.01); *H04L 63/04* (2013.01); *H04W 12/02* (2013.01); *G06F 2221/2143* (2013.01)

(58) Field of Classification Search
CPC ...... G06F 21/6209; G06F 16/00; G06F 21/10; G06F 21/30; G06F 21/60;
(Continued)

(56) References Cited

U.S. PATENT DOCUMENTS 8,639,625 B1 * 1/2014 Ginter .................... G06F 21/51
705/51
9,311,501 B2 * 4/2016 Islam .................. G06F 21/6218
(Continued)

FOREIGN PATENT DOCUMENTS

JP  2004-287566 A  10/2004
JP  2007-233983 A   9/2007
(Continued)

OTHER PUBLICATIONS

Apr. 18, 2019 Extended European Search Report issued in European Patent Application No. 17820307.1.
(Continued)

*Primary Examiner* — Malcolm Cribbs
(74) *Attorney, Agent, or Firm* — Oliff PLC

(57) ABSTRACT

A data conversion unit that converts all or part of first data including secret target information and a part including the secret target information, into second data for reading or viewing; a masking processing unit that performs masking processing on the second data, thereby generating masking data; a storage unit that stores the masking data; and an output unit that outputs the masking data stored in the storage unit.

16 Claims, 6 Drawing Sheets

(51) Int. Cl.
  *H04L 9/08* (2006.01)
  *G06F 21/10* (2013.01)
  *G09C 1/00* (2006.01)
  *H04W 12/02* (2009.01)
  *G06F 16/00* (2019.01)
  *H04L 29/06* (2006.01)
  *H04L 9/16* (2006.01)
  *G06F 21/60* (2013.01)

(58) Field of Classification Search
  CPC . G06F 2221/2143; G09C 1/00; H04L 9/0861; H04L 9/0891; H04L 9/16; H04L 63/04; H04W 12/02
  USPC .......................................................... 726/30
  See application file for complete search history.

(56) References Cited

U.S. PATENT DOCUMENTS

| | | | | |
|---|---|---|---|---|
| 2007/0300031 | A1* | 12/2007 | Jevans | G06F 21/60 |
| | | | | 711/166 |
| 2009/0207269 | A1 | 8/2009 | Yoda | |
| 2014/0068277 | A1* | 3/2014 | Metzger | G06F 21/6218 |
| 2015/0371049 | A1* | 12/2015 | Xavier | H04N 21/435 |
| | | | | 713/189 |
| 2015/0371613 | A1* | 12/2015 | Patel | H04L 63/1416 |
| 2016/0063269 | A1* | 3/2016 | Liden | H04L 12/40058 |
| | | | | 380/201 |

FOREIGN PATENT DOCUMENTS

| | | |
|---|---|---|
| JP | 2007-319342 A | 12/2007 |
| JP | 2010-225015 A | 10/2010 |
| JP | 2011-151770 A | 8/2011 |
| JP | 2012-238222 A | 12/2012 |
| JP | 2015-529064 A | 3/2014 |
| JP | 2014-236395 A | 12/2014 |
| JP | 2015-35072 A | 2/2015 |

OTHER PUBLICATIONS

Sep. 12, 2017 International Search Report issued in International Patent Application No. PCT/JP2017/024060.

Kuroiwa et al.; "A Scrambling Method for Motion JPEG Movies Enabling Detection of Moving Objects from Scrambled Movies"; IEICE Technical Report, Jan. 17, 2018; vol. 107, No. 438, pp. 37-42.

* cited by examiner

DATA MASKING SYSTEM

TECHNICAL FIELD

The present invention relates to a data masking system that facilitates reading or viewing of target portions to be read and viewed and securely concealing secret target information, when various types of data including the secret target information is provided for reading or viewing.

BACKGROUND ART

In recent years, approaches to a paperless society have been carried out from the viewpoint of the spread of digitization accompanying the development of digital technology and resource saving. In other words, the storage of documents and the like is shifting from analog formats such as paper, photos, and drawings, to a digital format stored in a database as a result of computerization.

In addition, public institutions and companies that are obliged to disclose information are required to give consideration for personal information and some secret target information. Accordingly, there is a demand for a data processing method (masking method) that allows secret target information and disclosable information to be separately displayed.

Moreover, various types of data including secret target information, such as music and moving images, other than traditional types, such as documents and images, have appeared and the importance of masking methods for these has also increased with the spread of multimedia data.

In addition, with the spread of high-definition 4K or 8K video cameras, video data taken with video cameras is not only viewed but also more often read as a still image (photo) which corresponds to one of its frames captured in 60 to 120 frames per second.

However, there is a risk that the data may leak due to transmission and reception of information via a communication network or be subject to eavesdropping or attack by third parties during communication. Further, the leakage of copies from within companies and the leakage due to external use or misplacement is also a big problem. Furthermore, with the development of cloud servers and the like, the operation of information accumulated in external recording apparatuses and utilized always has the risk of information leakage from within companies or from the outside. For this reason, data management that minimizes the damage caused by information leakage is necessary.

There are also personal problems related to both the benefits of digitalization and the risk of personal information leakage. For example, in recent years, more and more reading and storage services have been provided by cloud servers, while the damage such as privacy infringement caused by information leakage has become a big problem. The damage caused by information leakage varies depending on the contents of the data, that is, the presence or absence of secret target information and its importance, and serious damage may sometimes occur.

Accordingly, when data to be distributed for reading is encrypted and transmitted via a communication network, or data to be distributed is encrypted and recorded in an external recording device, the above-mentioned risk is greatly reduced, but leakage occurs because decrypting the encrypted data enables reading of all the information included in the data. Once the encrypted data is decrypted and displayed, the related information is also displayed, so that the risk arises that the information spreads to people who do not need to know the information after decryption.

In addition, examples of method of preventing information leakage and suppressing damage caused by leakage include encrypting data many times and complicating the encryption. However, such a method does not fundamentally solve the problem that the time and skill required for storing data and the cost are greatly increased, the convenience for the user is lost, and even if encryption is done many times as described above, the related information is unintentionally displayed once the data is decrypted and displayed.

Various techniques have been proposed to achieve both concealment and reading of these digitized data. For example, Patent Literature 1 discloses a medical image processing apparatus aimed at preventing leakage of patient information in the form of a character image included in a medical image and at allowing only the medical image to be read concealing the patient information at the output destination of the medical image.

To be specific, based on the selected image output format, the input medical image is arranged to create an output format image, the patient information region is extracted from the created output format image, and mask processing based on reversible conversion is performed according to the encryption key input only for the data and the thumbnail image.

Patent Literature 2 discloses an information transmitting apparatus with which not only character string elements but also image elements can be automatically subjected to mask processing and transmitted.

To be specific, in Patent Literature 2, the content information is separated into a character region and an image region, image elements extracted from the image region are compared with an NG image, and when they are similar, the rectangular region including the NG image in the content information is filled with a solid color to be displayed.

In addition, Patent Literature 3 discloses a content part concealing device for allowing a content provider to easily designate a part in the content to be concealed.

To be specific, the keyword and secret part extraction conditions are received from the user, and the sentence structure of the text part of the content is analyzed. Then, a part matching the secret part extraction conditions is extracted from the content and encrypted.

CITATION LIST

Patent Literature

Patent Literature 1: Japanese Patent Laid-Open No. 2007-319342
Patent Literature 2: Japanese Patent Laid-Open No. 2012-238222
Patent Literature 3: Japanese Patent Laid-Open No. 2004-287566

SUMMARY OF INVENTION

Technical Problem

However, with the techniques described in Patent Literatures 1 to 3, mask processing is applied to documents or images but cannot be applied to music, moving images, or multimedia data.

Further, in any of the techniques, the encryption is primary, so that in the stage of masking processing, the secret target information can be still read and information leakage and the third-party reading cannot be completely prevented.

From the above-mentioned circumstances, means for performing masking processing on data in a simple and speedy manner is required for allowing various types of data including secret target information to be easily used and minimizing the damage in case of leakage.

An object of the present invention is to provide a data masking system that is possible to establish both masking secret information included in various types of data for reading or viewing, while concealing a secret information part and allowing only other general data for reading or viewing to be read or viewed, and inhibiting secret information from being read or viewed in practical use even in case of divulgence/leakage of data before final masking.

Solution to Problem

In order to solve the above-mentioned problem, the present invention provides a data masking system comprising: a data conversion unit that converts a part including secret target information of all or part of first data including the secret target information, into second data for reading or viewing; a masking processing unit that performs masking processing on the second data, thereby generating masking data; a storage unit that stores the masking data; and an output unit that outputs the masking data stored in the storage unit.

Further, the data masking system may further comprise: an encryption processing unit that performs encryption processing on the first data, thereby generating encrypted data, and the storage unit may store the encrypted data, and the output unit may output the encrypted data stored in the storage unit.

Further, the data masking system may further comprise a data link unit that links the encrypted data and the second data.

Further, the data masking system may further comprise: a secret part selecting unit that selects a secret target region including the secret target information included in the second data, and the masking processing may include first masking processing performed on the secret target region selected by the secret part selecting unit.

Further, the masking processing may further include second masking processing performed on a region other than the secret target region in the second data.

The second data may be plural, the second masking processing may be performed on all of the plurality of the second data, and the first masking processing may be performed on part of the plurality of the second data.

The second data may be plural, and the second masking processing may be commonly performed on a same region of each of the plurality of the second data.

The masking processing may generate third data obtained by cancellation of the second masking processing and reconstruction or decryption, and the third data may be subjected to the first masking processing.

Cancellation of the second masking processing may be applied to part of the second data.

The third data may be copied, and the copied third data may be inhibited from being output and stored in the storage unit.

The data masking system may further comprise an encryption history recording unit that records a history of the encryption processing and the masking processing.

The output unit may further include an authentication input unit in which an authentication key is enterable, and authentication may be required when the masking data is output.

The data masking system may further comprise a keyword assignment unit capable of assigning a search keyword to the encrypted data and the masking data.

The storage unit may include a first storage unit that stores the encrypted data, and a second storage unit that stores data for masking.

The masking data may be temporarily reconstructed or decrypted with a password or a decryption key so that the masking data returns to a masking state when a predetermined condition is satisfied.

The data masking system may further comprise a communication unit capable of communication with a network and the output unit may output the encrypted data and the masking data to an external device via the network.

When both or one of the encrypted data and masking data for reading or viewing is discarded, nonperiodic data may be added to the data, the second masking processing may be performed on the data, and the data may be subjected to data shredding processing that divides data into multiple pieces of data so that the data becomes non-reconstructable, and may be discarded.

The data masking system may further comprise a reading or viewing history recording unit that records a history of and/or response to the reading or viewing, when the masking data output from the output unit is provided for reading or viewing.

The data conversion unit may further have a function of designating a resolution when the second data is an image, and designating a viewing accuracy when the second data is moving images or music.

Advantageous Effects of Invention

The present invention is possible to establish both masking secret information included in various types of data for reading or viewing, while concealing a secret information part and allowing only other general data for reading or viewing to be read or viewed, and also inhibiting secret information from being read or viewed in practical use even in case of divulgence/leakage of data before final masking.

In addition, data link processing, such as command attachment, is performed on the original data to enable linking between encrypted data obtained by encrypting the original data and masking data obtained by performing masking processing on data for reading or viewing, thereby greatly increasing the convenience in management.

DESCRIPTION OF EMBODIMENTS

A data masking system according to an embodiment of the present invention (hereinafter referred to as "present system". The same applies to other embodiments, operations, and utilization cases, and the like) will be described in detail with reference to the accompanying drawings.

Figure 1:
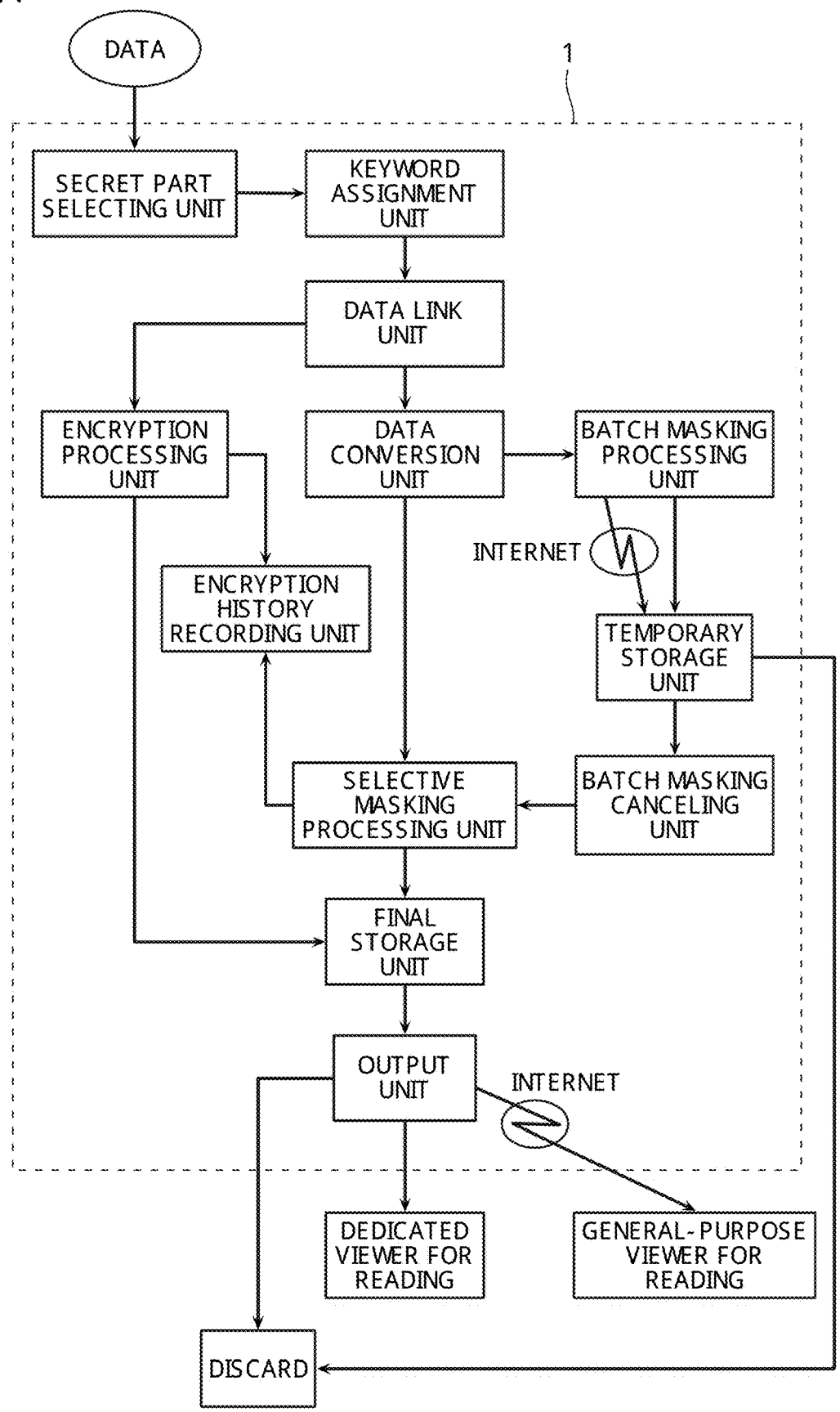
FIG. 1 is a system diagram showing the overall configuration of a data masking system according to the first embodiment.

As shown in FIG. 1, the configuration of the present system includes a data conversion unit for converting a part that includes secret target information and is all or a part of the data into data for reading or viewing (to be read or viewed); masking processing units (batch masking processing unit and selective masking processing unit) for generating masking data by performing masking processing on data for reading or viewing; an encryption processing unit for performing encryption processing on data including secret target information to generate encrypted data; a final storage unit for storing encrypted data and masking data; and an output unit for outputting encrypted data and masking data.

Further, the present system includes a secret part selecting unit that selects a secret target region including secret target information included in the data. Further, the masking processing unit is composed of a selective masking processing unit and a batch masking processing unit. The selective masking processing unit performs masking processing on the secret target region in the data for reading or viewing selected by the secret part selecting unit. The batch masking processing unit performs masking processing on the region in the data for reading or viewing other than the secret target region. In this masking processing, for example, when the data for reading or viewing is an image, various methods, such as striped filling, check pattern filling, whole filling, blurring processing, pattern addition, black painting, white erasing, adding dummy data, can be employed. The conversion of the color of the secret target region is also defined as a part of the masking processing in view of the fact that it similarly conceals the original data.

The present system also includes a keyword assignment unit. The keyword assignment unit assigns a search keyword to the original data. With this keyword assignment, the same keyword is assigned to each of the encrypted data obtained by the encryption processing and the masking data obtained by the masking processing in a later process, thereby enhancing the convenience in operation management.

The present system includes a data link unit. The data link unit assigns, for example, a command such as #01# to the original data. Consequently, this command assignment also assigns the command #01# to the encrypted data and the masking data. Thus, the encrypted data and the masking data to which the same command is assigned are linked to each other.

The data conversion unit in the present system converts each piece of data including secret target information into data for reading or viewing to be read or viewed by user with showing a part of the contents of the data. To be specific, for example, the part is a thumbnail image when the original data is an image, partial pages or a partial area in a document when the original data is the document, and a selected part when the original document is music, moving images, or the like. It should be noted that the data to be converted is not limited to these, and they may be converted into data different from the original data. Further, when the data for reading or viewing is an image, the data conversion unit may also have a function of designating the resolution. Alternatively, when the data is moving images or music, it may also have a function of designating the viewing accuracy (the band or the number of gradations).

The present system also includes an encryption processing unit. The encryption processing unit additionally performs various types of encryption processing on the data received from the data link unit. The encryption processing here is commonly-used encryption processing, such as a common key cryptosystem scheme (AES) that achieves encryption by protection using a password, camouflage by changing the extension, changing the security level, changing the algorithm, and inputting the password; or a scheme using a secret key/public key (RSA). It should be noted that the encryption processing unit does not always perform encryption processing.

The system also includes an encryption history recording unit. The encryption history recording unit includes a medium that can record the history of encryption processing and/or masking processing performed in the encryption processing unit or masking processing unit (the batch masking processing unit and the selective masking processing unit).

In addition, in this encryption history recording unit, settings can be made so that not only the history of encryption/masking but also the history that each file is stored in a removable medium, such as USB, the history that it is transmitted to the outside via wired or wireless communication, and the like are stored. Consequently, when data is leaked or divulged, the leakage source can be determined by checking the history.

As described above, leaving the history of encryption/masking has the advantage, in view of the operation, that the management of encrypted and masked files and the contents of the encryption/masking is facilitated.

The present system also includes a temporary storage unit. The temporary storage unit temporarily stores the data for reading or viewing that has been subjected to the batch masking processing. Subsequently, the temporary storage unit transmits the data to the batch masking canceling unit via a LAN or the Internet.

The batch masking canceling unit cancels the batch masking processing of the received data for reading or viewing and connects and transmits it to the selective masking processing unit. It should be noted that the batch masking canceling unit may be integrated with the selective masking processing unit so that the selective masking processing is performed simultaneously with the cancel of the batch masking.

The selective masking processing unit performs masking processing on the secret target region of the data for reading or viewing. Thus, selective masking data is generated. The generated selective masking data is transmitted to the final storage unit and stored in the final storage unit, or temporarily stored directly in the storage medium in the selective masking processing unit. For this selective masking, as for the batch masking, various schemes can be employed. The cancellation of the batch masking or selective masking may have a temporary canceling function as a masking tool, like a removable seal, that allows peeling and re-masking to be repeated more than once as needed. In addition, masking processing can be added or changed.

The final storage unit stores the encrypted data received from the encryption processing unit and the masking data received from the masking processing unit. The final storage unit also has a function of an output unit for outputting the stored data to the outside via a LAN or the Internet. In other words, this final storage unit also has a function of a communication unit. Needless to say, the final storage unit and the communication unit may be separately provided. The final storage unit transmits data for reading to a general-purpose viewer for reading or a dedicated viewer for reading via an output unit connected to a LAN or the Internet. When the data is moving images or music, it is transmitted as general-purpose data for viewing or dedicated data for viewing.

The general-purpose viewer for reading and general-purpose data for viewing can be freely read or viewed by anyone, and masking data can be freely read or viewed without using a password or the like. Note that, in addition to the restriction on the period of reading or viewing or the restriction on the number of times of reading or viewing, reading or viewing conditions (e.g., age and membership) may be set for reading or viewing.

The dedicated viewer for reading and dedicated data for viewing are permitted to be accessed only by specific persons. A dedicated authorization ID, a password, and authentication, such as personal authentication, are required for data for reading or viewing.

Further, the general-purpose viewer for reading, the dedicated viewer for reading, and the data for viewing may have the temporary cancelling function described above, at the time of reading or viewing using them. Further, the general-purpose or dedicated viewer for reading or data for viewing is provided with a reading or viewing history recording unit, i.e., a medium that can record the reading or viewing history related to the reader or viewer. More preferably, the reading or viewing history recording unit may also have a feedback function that allows the comments and opinions of the reader or viewer, that is, the feedback from the reader or viewer to be written. Thus, the level of the interest of the reader or viewer can be determined based on the reading or viewing history record and the comments and opinions from the reader or viewer. This feedback can also be transmitted to an information terminal, such as a PC, via a cloud server.

For example, for some official documents, the storage is made not for reading but under the obligation to keep it for a long period due to the request by the law or the like. Therefore, data is sometimes not transmitted to either the general-purpose viewer for reading or dedicated viewer for reading. In that case, the final storage unit keeps holding the data in the concealed state, encrypts it, and discards it after the lapse of a storage period.

In addition, when one or both of the pieces of masking data for reading and viewing linked to the encrypted data is discarded, the data is subjected to fine division processing in which it is shredded by the data shred function, and the shredded data is also scrambled and then is discarded. At this time, the link data is also decomposed and cancelled. Moreover, when the data is discarded, the data may further be encrypted before being discarded so that it cannot easily be decrypted.

At this time, regarding the reading image masking data, the masking data is divided into a matrix having an arbitrary size, the data is averaged in whole or in division by division, the data is subjected to the above-described fine division involving shredding by the data shred function, and the shredded data is scrambled (processing for further roughly stirring the shredded data) and is then discarded. The data averaging method can generate a mosaic image as a whole image by obtaining a color by tabulating and averaging the colors (RGB, CMYK or the like) of all the pixels arranged in rows and columns in one block of the matrix of the image, and replacing the color of all the pixels in the one block with the obtained color. In the case of text data, dummy data is randomly added to the text data, and the data is divided according to an arbitrary data size, scrambled division by division, and discarded.

Regarding the masking data for viewing, the video image is made invisible using white fog exposure, subjected to color conversion or deformation or addition of noise or dummy data, fine-divided by the number of frames of the image constituting the video or an arbitrary reproduction time, scramble-edited, and discarded. In this case, it is more preferable that encryption processing be added before or after fine division processing performed on the data, and the data be then discarded. There is also a method in which the indecipherable masking image of this irreversible image is superimposed on the upper layer of the data of the secret part so that it looks like masking processing is performed on the display, thereby preventing the leakage of the lower-layer data hidden in the masking part. The hash data of a password with a long number of digits used to remove the masking processing in the irreversible image superimposed on the upper layer of the data of the secret part is set as a decryption key. If it is indecipherable with the hash data and the masking processing in the irreversible image should be removed, a password with a matching hash value may be selected from a plurality of passwords stored in a PC, thereby removing the masking processing. In addition, when reading or reproduction of the secret part should be permanently avoided, the masking part is deleted and it is rewritten to irrelevant dummy data.

When masking data should be discarded, it can be safely discarded by additionally performing the following processing. In particular, in general, in deleting data stored in a storage device in a PC, an external storage device, such as a cloud server, or a storage device in a smartphone or the like, only the header of the data is deleted in some cases. In view of this, using an application software dedicated for deleting data masking, dummy data is added to the data and masking processing is performed. In the case of image data, matrix division processing is also performed, image averaging processing is performed division by division in the matrix, and scrambling of the array of matrix division is performed, so that the data is safely discarded. At this time, the data may be further processed using an existing data erasing program and then discarded.

Figure 2:
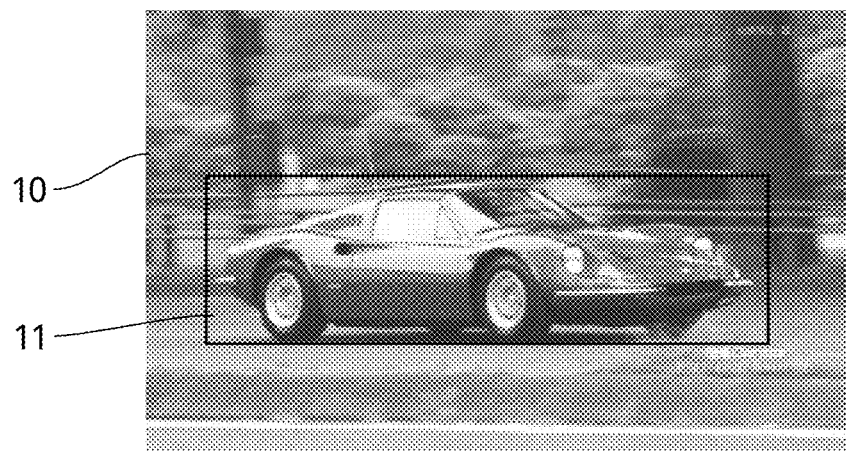
FIG. 2 shows each masking state seen when an image file is masked using a data masking system of the present invention.
Figure 2:
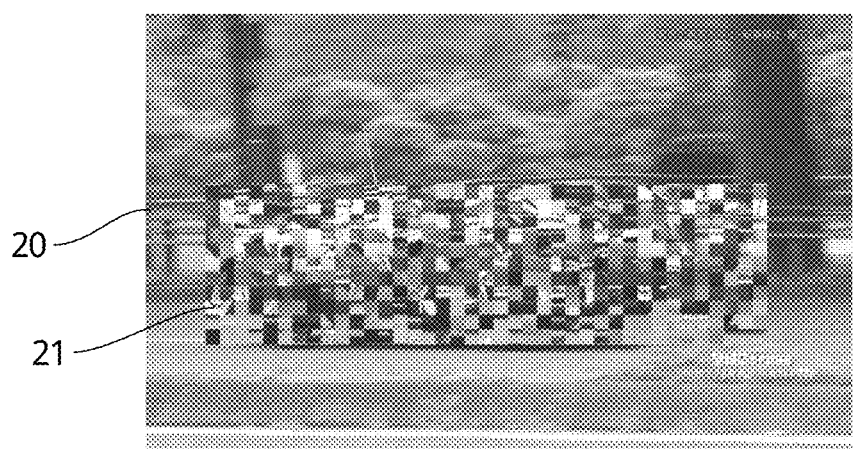
Figure 2:
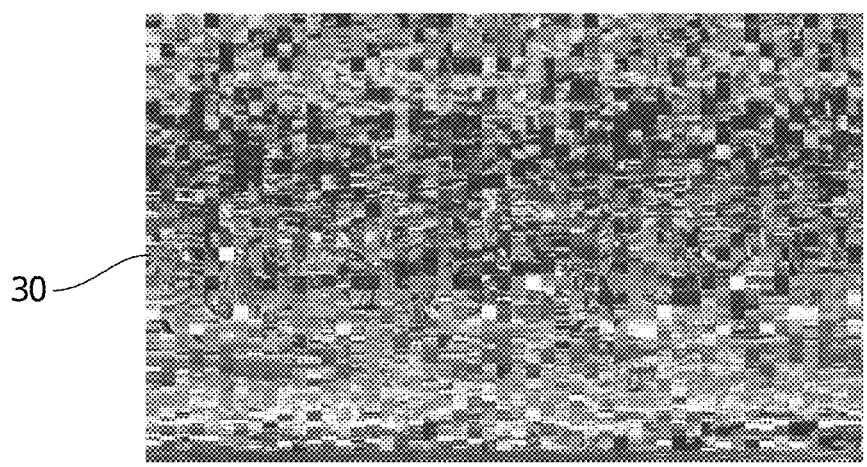

FIG. 2 shows specific examples of each masking process. The original data 10 is an unpublished photograph of a new model car prototyped by a car manufacturing company, which should be concealed. Accordingly, the secret part selecting unit selects a secret target region 11 including the information of the car to be concealed.

Subsequently, the selective masking processing unit performs selective masking processing (indicated by the check pattern in FIG. 2). Thus, masking data 20 is generated.

Before the selective masking processing, in the batch masking processing unit, batch masking data 30 may be generated. In this state, the data is stored in the temporary storage unit, transmitted to the batch masking canceling unit so that the batch masking is canceled, and then transmitted to the selective masking processing unit.

Thus, the data transmitted to the selective masking processing unit is not the original data 10 including the secret target information data but the batch masking data 30. Consequently, even in case of leakage or hacking of information in the process from the data conversion unit to the selective masking processing unit, the secret information is not easily read or viewed. Adding dummy data at the time of the batch masking leads to higher security even in case of disclosure. Needless to say, encryption processing may be additionally performed on the data masked as described above.

Second Embodiment

Figure 5:
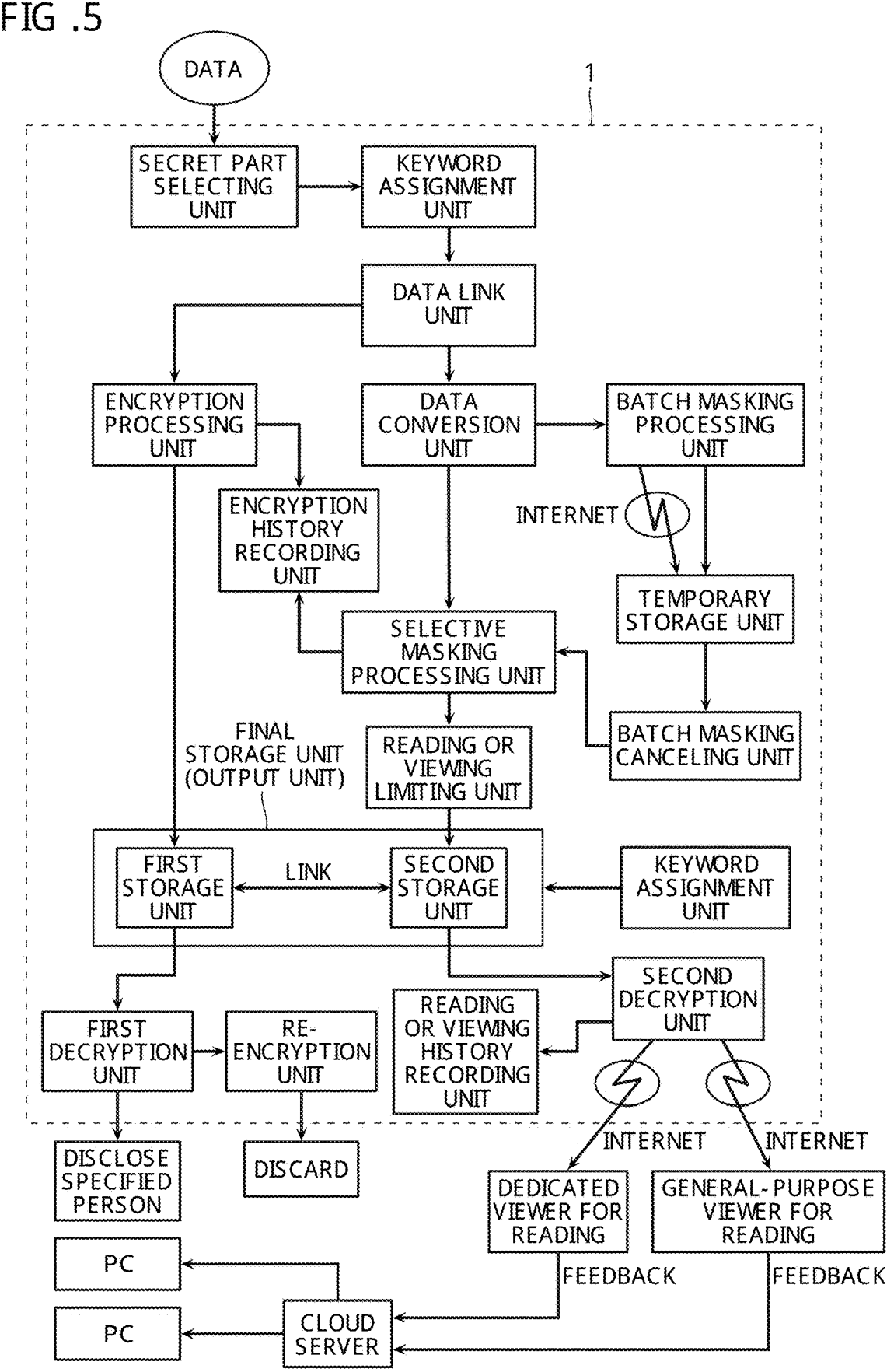
FIG. 5 is a system diagram showing the overall configuration of a data masking system according to the second embodiment.

The present system according to the second embodiment will now be described with reference to FIG. 5. The overall configuration of the present system according to the second embodiment is similar to that of the first embodiment. For this reason, the following description will focus mainly on portions different from the first embodiment, and the portions that have been already described may be omitted.

In the second embodiment, the final storage unit includes a first data storage unit (first storage unit) for storing the encrypted data obtained by encryption in the encryption processing unit, and a second masking data storage unit (second storage unit) for storing the masking data obtained by masking processing. As shown in FIG. 5, the output unit of this embodiment is integrated with the final storage unit.

The first data storage unit (the first storage unit) and the second masking data storage unit (the second storage unit) include different disconnected recording media in order to prevent interactive data communication between them. Note that, as described above, the data stored in the units are linked with a command or the like. Further, simultaneous access is made impossible. Separating and disconnecting the first data storage unit and the second masking data storage unit in this manner can prevent two pieces of data from being leaked or divulged at the same time, unlike in the case where the encrypted data and the masking data are stored in one storage unit.

Further, in this embodiment, a reading or viewing limiting unit is provided. For reading or viewing, the reading or viewing limiting unit may disclose data after seeking information of the reader or viewer. Moreover, the reading or viewing period and the number of times of reading or viewing may be limited.

Further, in this embodiment, a re-encryption unit and a decryption unit are provided. For the encrypted data and the masking data stored in the final storage unit, the re-encryption unit performs encryption processing different from the encryption and masking in these data. Moreover, these data may be discarded after the lapse of a predetermined period. Alternatively, in the stage prior to transmission to the general-purpose viewer for reading or dedicated viewer for reading, the data is transmitted to the decryption unit again for decryption and transmitted to the corresponding viewer. This contributes to a further increase in the security level.

(Procedure of Encryption Processing)

A description will now be given of an example of the procedure of the encryption processing performed in the encryption processing unit in the present system.

First, an encryption GUI is developed so that encryption or decryption can be performed by a normal file operation, which allows anyone to easily use it. In addition, the icon of the encrypted file is changed to make it visually user-friendly and prevent leakage of encryption.

To be specific, the following procedure was used.
(1) First, a file (or a folder) of data to be encrypted is selected.
(2) When the file is put in an encryption folder, file-by-file encryption is automatically performed and the icon of the file changes at the same time.
(3) Entering a decryption key and making a click performs decryption and shows the contents (plaintext). The icon of the file also returns to the original one.
(4) When the decrypted file is shown, edited, and overwritten, it is automatically encrypted again and saved.
(5) When the decrypted file is shown and designated as a file to be masked, it can be automatically masked and saved.

(Encryption Unit)

In a scheme of file-by-file or folder-by-folder encryption, a file or folder to be encrypted is selected and a password is entered, thereby performing encryption. Similarly, a file or folder is selected in the case of decryption. A file, or a folder or virtual drive is generated and only its contents are encrypted and output as a regular file on the computer. File-by-file encryption is simple and convenient when the data is attached to an E-mail or encrypted to be taken out, and folder-by-folder encryption is convenient for storing files regularly used and large amounts of files.

In addition, encrypting a hard disk (HDD) as a whole can prevent information leakage due to the theft or loss of a laptop PC. Normally, all the data is protected unless the password and decryption key used to start up a PC is known; however, once the password and decryption key are entered for startup, it becomes vulnerable. Corporations can introduce it as a measure against the theft and loss of laptop PCs, encryption processing can be executed by command processing, and applications can automatically start up simultaneously with decryption.

Storage media, such as a hard disk drive (HDD) and a flash memory, are managed by encryption processing involving encryption and decryption of data. Advanced encryption standard (AES)-XTS is becoming a standard scheme as a scheme for encrypting storage media. With AES-XTS, AES encryption or decryption is performed on the sector number specifying the position on the disk of the storage medium.

(Summary of Operation of Each Type of Data)

A description will now be given of the operation of each type of data common to the present systems according to each embodiment.

(1) Text Data

In the case where masking processing is performed for data to be concealed which is text data, such as diaries, reports, development project progress management information, sales slips, and personal information on application forms, selective masking processing involves keyword-searching the text to be masked or detecting columns or items needed to be masked, such as address columns, name columns, and money columns, and selecting them by batch or in sequence, thereby performing masking processing. Needless to say, nothing should be done for pages that do not require masking or the above-mentioned batch masking processing may be performed. At this time, even a page that does not require masking may be masked as dummy processing serving as a measure to prevent leakage by distracting the opponent. With dummy data added, even if the password leaks, since the dummy data is still mixed, double safety measures are taken so that leakage will not occur unless dummy data is reconstructed.

In the selective masking processing, for those in which the original text data has been converted into the PDF image format, OCR processing based on the PDF image is performed, and for those in which text can be obtained, text to be masked may be keyword-searched and selected by batch or in sequence to be subjected to masking processing, or addition can be freely made.

(2) Image Data

When the data has masking processing for, for example, photos, or illustration images, in the selective masking processing, for the data in which the original data is in the image format, text part and image part are selectively separated using a function related to OCR processing, and image searching with identifiable image data can be performed, masking processing is performed on the image obtained by image position searching. For example, in the case of masking processing for, for example, MRI images for medical use, a keyword assignment unit performs a search keyword such as a name, a disease name, an imaging date, or a disease condition.

Further, in the selective masking processing, masking processing is performed on part or all of the data in which the original data is in the image format. Furthermore, for the data in which the original data is in the image format, the image can be processed in such a manner that part of or all of the image is subjected to color conversion processing as a part of the masking processing, part of the image is changed to dummy data that can be reversibly converted, or a digital watermark is inserted.

(3) Video, Music Data, Sound Recording Data, and Conversation

When the data has masking processing for, for example, movie, music, sound/recorded conversation, or real-time conversation, the selective masking processing is performed by converting the data into image data for reading, or converting it into data for viewing. When the data is converted into image data for reading, the image can be selected from the template images registered and stored in advance in the data conversion unit, an external cloud server, or the like. For data for viewing, for example, the data corresponding to only for a certain period of time from the start of the data, the data obtained by intermittently connecting multiple parts in the middle can be employed. Subsequently, batch masking processing is performed on the image data or data for viewing, thereby generating batch masking data. Masking for this batch masking data is then canceled and part or all of the data is subjected to selective masking processing. At this time, the canceled data may be made non-reproducible or deleted. For real-time conversation, batch continuous masking processing is performed with a sound effect (SE) of a peep, music, silence, noise or the like.

In the selective masking processing for the data in which the original data is in the MIDI code format of music, masking image display data related to the image display data of the score is generated, codes to be masked are searched and selected by batch or in sequence, and image display masking processing for the score is performed. Alternatively, the MIDI code is converted into sound source data which is then partially masked and made viewable.

For music data, such as MP3 (MPEG1 Audio layer3) and AAC (advanced audio coding), with the progress code and time, a secret part is subjected to silent processing and masking of filtering of noise and SE in such a manner that they can be reconstructed. Masking processing may be performed by changing the compression algorithm of the audio part that cannot be reproduced during the concealing processing.

(4) CAD Data and Graphic Data in Other Formats

When the data is two-dimensional or three-dimensional CAD data or graphic data in other formats, commands, such as #start # and #end #, may be entered at the header and footer of a part of the data program to be concealed to conceal the part. The graphic data may be encrypted, subjected to imaging processing, and then subjected to masking processing. The masking processing at this time is similar to that in the case of (2) Image Data mentioned above.

(5) Other Types of Data

When the data is a program, metadata, a mathematical expression, a game, a quiz, or the like, in the selective masking processing, the original data is a program or metadata, and batch masking data is generated from the data, and part or all of the data is subjected to selective masking processing. Similarly, in this case, as the above-described graphic data, commands, such as #start # and #end #, may be entered at the header and footer of a part of the data program for concealment.

(Procedure of Masking Processing)

A detailed description will now be given of the procedure of masking processing for each type of data. The numbers assigned to the following processes are merely for convenience and do not necessarily mean that processing is performed in numerical order. The same applies to the data described later.

(A) Document Data

1. A page or part to be readable or concealed is selected from the document data (the secret part selecting unit), and the corresponding document data for reading is selected and copied.
2. A common keyword is assigned to the document data and the data for reading copied for masking (the keyword assignment unit).
3. A code such as a book name is assigned to the document data and the data for reading copied for masking and then serves as a link code (the data link unit).
4. The original document data is encrypted by batch for all pages or chapter by chapter (the encryption processing unit).
5. The encrypted document data is stored in the storage device (the first storage unit).
6. The copied document data is subjected to image PDF processing, and is converted into image data to be data for reading (the data conversion unit).
7. If selective masking cannot be done immediately, a masking pattern for batch masking is selected and automatic processing is performed (the batch masking processing unit).
8. Upon completion of the above-described masking, the data is temporarily stored (the temporary storage section).
9. The temporarily stored batch masking data is retrieved from the temporary storage unit and selective masking processing is performed. In selective masking, one is read and selected from the preregistered and stored template images, such as picture masks and blur functions, that are selective masking functions. Picture masks are also preregistered to the present system so that a picture is selected to mask a secret part. Note that selective masking may be directly performed after generation of data for reading in 6 (the selective masking processing unit).
10. When a reading limitation needs to be applied to selectively masked masking data, a type of limitation is selected (the reading or viewing limiting unit).
11. After checking the reading limitation, the selective masking data is stored in the storage device (the final storage unit).
12. It is published so that it can be read on the reading date (the general-purpose viewer for reading and the dedicated viewer for reading).
13. If necessary, re-encryption processing is performed to increase the encryption strengths of the stored data and the masking data (the re-encryption unit).

14. The data is decrypted in the decryption unit and is stored so that it is readable on the reading date through the viewer for reading (the decryption unit).

(B) Image Data

1. The target image data to be read is selected from the image data, and is copied at the required resolution. At this time, it is preferable to reduce the amount of data for reading, by lowering the resolution to copy the data. Subsequently, a page or part of the image data for reading to be readable or concealed is selected (the secret part selecting unit). Further, in general, thumbnail images (e.g., about 50 to 200 dpi on a standard basis) are created by scanning the document, drawing, or the like at a required resolution using a scanner, and capturing and image-processing the image data by batch. At this time, thumbnail images are created only for, among the pages, cover pages and important pages. 2. to 14. In these processing, "image data" replaces "document data" and "thumbnail image" replaces "data for reading" in the procedure of (A) Document Data described above.

(B') PDF Image

For PDF images, the thumbnail images of all pages are displayed and masking processing is performed following the rules below.

1. The thumbnail images of all pages are displayed and the data to be masked is designated using a masking function software of the present system. The PDF data already filed can also be designated with a designation software.

2. A masking automatic processing server is selected and the designated masking processing is automatically performed.

3. After the masking processing, the masking data is stored and may be stored in a cloud server for utilization.

4. The reconstruction or decryption of the masking data may require a password or a decryption key.

(C) Audio, Music, and Video Data

In the case of audio, music or video data, a part selected, as data to be viewed and published, from all the data for viewing corresponding to the original data will hereinafter be referred to as data for viewing. 1. A part to be published for viewing/concealed is selected from the original data for viewing (the secret part selecting unit) and the corresponding data for viewing is selected and copied. In principle, data to be viewed and published is subjected to selection of a part for viewing while being as the original data. 2. to 5. In these processing, "viewing" replaces "reading", "data for viewing" replaces "document data", and "data for viewing" replaces "data for reading" in the procedure of 2. to 5. in (A) Document Data described above.

6. The copied data for viewing is subjected to edition processing and becomes data for viewing to be published (the data conversion unit).

7. to 14. In these processing, "data for viewing" replaces "document data", and "data for viewing" replaces "data for reading" in the procedure of 7. to 14. in (A) Document Data described above.

(D) CAD Data (Vector Data)

1. A drawing, a final drawing, or the like to be readable/concealed is selected from the CAD data (the secret part selecting unit) and the corresponding CAD data for reading is selected and copied.

2. to 14. In these processing, "CAD data" replaces "document data", and "CAD data for reading" replaces "document data for reading" in the procedure of (A) Document Data described above.

(E) Metadata Such as Programs, Codes, and Numerical Tables

1. Data contents or a part to be readable/concealed is selected from the metadata (the secret part selecting unit) and the corresponding metadata for reading is selected and copied.

2. to 14. In these processing, "metadata" replaces "document data", and "metadata for reading" replaces "document data for reading" in the procedure of (A) Document Data described above.

As a common item to each piece of data, a two-dimensional barcode or a cloud server code may be assigned to a seal for masking. Note that a cloud server code is an access code for connecting to a cloud server. Alternatively, a one-time password may be issued so that the data can be read with a viewer software required for reading. Search keywords can be registered to the original data and data for reading or viewing. Needless to say, reading or viewing may be limited or discarded after a certain period of time.

(Case Study)

A more detailed example of the operation of the present system will now be explained.

(Official Document Disclosure)

The secret data of an official document is subjected to selective masking and electronically published, and the secret data excluding the masking part is made readable. After the lapse of the number of years of information concealment, the selective masking part is subjected to cancelling processing (is decrypted). Similarly, part of the selective masking is canceled according to the importance of the secret data to disclose the official document. Note that, in case of mixture of the remaining part in which selective masking processing is not completed at the time of publication, the remaining part is temporarily published after the second collective masking. Further, the official document may be published as first masking data by generating data for reading in Braille or audio data for viewing for those who cannot see or read letters. The same applies to documents other than official documents, created by schools, companies, and the like.

(Personal Information Management)

For every personal information, such as resident registry of municipalities and the like, school's student information, company's customer information, and hospital's electronic medical record, parts, such as part of names and addresses, and contact addresses, are subjected to masking processing and operated. When information administrators, such as resident registry operators, school teachers, company staff, or hospital doctors, need these personal information, they are temporarily canceled with a password or a decryption key to be made readable, and settings can be made for a program of the viewer for reading so that they automatically returns to the masked state after being read. The character information of this case may be published as first masking data by generating data for reading in Braille or audio data for viewing for those who cannot see or read letters. It is also possible to add a GPS code as information permitting reading and publish it only to a specific location.

(Multiple Passwords)

For one with a particularly important secret portion, multiple passwords are set. Further, different passwords are set for each data content (e.g., for each page). To those who are permitted to read, passwords are sent by telephone or through separate e-mails from different addresses. Furthermore, whether or not masked data has been falsified is determined by making the hash data of the data before and after disclosure and comparing them so that the presence or absence of falsification is checked. In addition, the certificate from the certificate authority may be given for authenticating the date and time.

(Application of Method of Displaying Masked Data)

For the masked data, related data to be read or reproduced at the same time as when the masked data is read or reproduced may be read or reproduced in cooperation with it on a PC. For example, the photo parts in the document data may be masked and photo presentation or video reproduction may be performed at the time of reading. Further, audio data may be linked to a part of the document and reproduced for visually impaired people. In the case of video data, character data or the like related to the video may be displayed. Reproduction or reading of link information may be started according to the intention of the reader or started by a motion sensor or other sensors. Further, during presentation/reproduction in which all or part of the data is masked, for example, a "reading card" with a password function therein created is held over a card reader, and entering a correct password launches and displays a presentation/reproduction application software on the PC. In addition, decryption presentation may be performed only while a specific key is pressed, or for a short time for only seconds designated as temporary presentation. Moreover, decryption presentation/reproduction of the encrypted original text and the original video may also be linked.

(Internet Order Printing)

When ordering printing on the Internet, the print orderer (customer) transmits image data, which is obtained by inputting print data, a color-managed color sample print, and color chart data, through a scanner to the printing company. At this time, the 1-bit print data is encrypted, and for the scanning data of the 8-bit color sample print, a secret part is subjected to masking processing, and the data obtained by scanning the color chart is transmitted to the printing company. The printing company is informed of the encryption key (based on the public key scheme) and the masking canceling password in advance or with a different communication scheme. In addition, at the printing company, the print data is decrypted with the encryption key (of the private key), and for the color chart data and the color sample print data, the masking of the secret part is canceled using the password and a color management profile is created using the color chart data. With the color sample print data, a print color proof print is output in the design department using the profile.

This print color proof print is shown to the print orderer and a color proof instruction is given. This work may be done on the Internet. In the case of color proof or proofreading on the Internet, a secret portion is subjected to masking processing and settings are made to allow it to be read with a password. This prevents information leakage between the Internet, the printing company, and the print orderer.

Further, as described above, the printing company generates 1-bit output data for a printing plate from the print data in the prepress department and encrypts it, masks the secret part of the 8-bit color sample data, and transmits both of them to a printing factory.

At the printing factory, the encrypted 1-bit print output data is decrypted with a separately sent encryption key, and the printing plate is output with an imagesetter.

The masked color sample data is returned to be readable with a password and is displayed to serve as print color sample data. Further, when necessary, printing is done using a color-managed print output as a color sample, so that the print data from the print orderer is safely operated.

For example, in order to prevent the leakage of personal information such as the name and address of a contractor printed on a part of printed matter related to insurance or the like, the first masking data is given to the printing company. In the case where personal information is printed with a digital printer, such as a print on demand (POD) printer, with which printing can be done with the address, name, or the like replaced, data containing masked personal information is transmitted to the POD digital printer, temporary decryption of the masking part is performed immediately before printing, and print data is generated and printed. This is also applicable to offset printing, for example. At the stage of masking processing, encryption triggered by operation of a print execution button or a key for erasing masking may be assigned in advance, and temporarily decrypted data may be forcibly erased by a dedicated software after printing.

(Creation of Software for Temporary Decryption of Masking)

Regarding decryption of selective masking images, videos, and data obtained by the first masking, a software that performs only temporary decryption, forcibly erases only decrypted data at almost the same time as and immediately after presentation for reading, and returns to selective masking is developed, and is installed in a reading device. After data copy is performed a limited number of times at the time of temporary decryption, only the decrypted data is forcibly erased, and only the selective masking is presented again. For cancellation, a temporary canceling use version and continuous canceling use version software are developed and provided.

(Input Device with Masking Function)

An input device and a system can also be provided which perform the second simplified masking processing after the input or concurrently with the input. For example, when the first selective masking function software is also installed or set up in the computer and the purchaser presses the confirmation button for a license request, selective masking processing may be enabled so that selective masking can be performed. For cancellation of selective masking, a temporary canceling use version and a continuous canceling use version are offered. Alternatively, a device that can perform encryption and masking processing may be attached as an externally connected device of the aforementioned device. With these functions, the data can be copied to the input data directly or for masking at the same time as an input operation, such as input through a scanner or photographing with a digital camera, encrypted or subjected to masking processing and then stored or securely transmitted by communication.

(Masking Processing Filing of Scanning Data)

Companies and others have stored copies of documents and the like until now; however, with electronification, such storage of documents using scanners is being done using masking technology. For example, a document of size A4 is scanned by a continuous reading scanner to be converted into an electronic image file. Subsequently, an application software for data masking is started up on a PC, and entire masking processing is performed by batch in a short time. Further, in the case of PDF data, for example, full reversible entire masking processing may be performed directly on the data which may be then stored.

Afterwards, the entire masking is canceled page by page, and if there is a part that requires concealing processing in the page, partial masking processing is carried out and the data is stored. This operation is then performed for each page in order in the same manner. When the GPS data, the sensor information related to the ID card of the selective masking work licensee, and other additional commands, such as a reading date and time limit, should be linked page by page, link processing is performed and the data is stored. For example, information with GPS positional information may be linked so that only the GPS position can be read or the GPS map is presented.

(Photo Masking Online Album; Photo Sharing Site)

When a photo is uploaded to a sharing site, to conceal a private part the user does not want to show to others or to prevent the shooting location from being revealed, a part of the photo, such as the background, is subjected to masking processing and the photo is then uploaded to the website. When a personal photo album is disclosed within a particular family or the like, masking processing is performed just in case of information leakage. A masking canceling key or a one-time password is separately sent to a reading licensee. In addition, at the time of posting, copy of a masking photo may not be allowed, or the program that automatically erases the masking photo after a certain period may be linked to the masking photo.

(Report Online Transmission)

In the case of online transmission/reception of data such as various reports from government offices and companies, important contents are subjected to selective masking or entire masking. If necessary, it is further encrypted and the data is then transmitted/received using a communication line such as a LAN, a dedicated line, or the Internet and is stored. The administrator in a public office or company transmits a dedicated viewer software for reading that limits the reading date and time and disclosure collection to the reading licensee on the Internet, and transmits a password for reading by different means. It is also set to a dedicated viewer software for reading that has a function for the case where the output is permitted and the output is disabled, so that the reading licensee reads the data. Furthermore, if necessary, data that has been encrypted with a common key and further encrypted with a public key may be transmitted and received.

(Sales Slip)

In the case of transmission and storage of various types of sales slips, a secret part is subjected to the first masking processing and is transmitted or stored via a communication line, such as a LAN, a dedicated line, or the Internet. The sales slip creator separately transmits the reading password of the dedicated viewer software for reading for disclosure with a limited reading date and time to the reading licensee. It is also set to a dedicated viewer software for reading that has a function for the case where the output is permitted and the output is disabled, so that the data is read.

(Time Letter Service)

For personal use, there are electronic letters with which a letter sender leaves data on a cloud server or the like and the data is transmitted to a PC or smartphone after a certain period of time, such as a year or 10 years, on a birthday or other anniversaries. Thus, a secret part of letters, voices, videos, music and the like is masked and stored, and the data is decrypted and presented on the disclosure date or a message to the future can be delivered. For business use, there are e-mails or electronic letters, which concern an invitation letter, a new product announcement, company information, or the like created in advance, transmitted to a PC or smartphone after a certain period of time. Thus, a secret part of letters, voices, videos, music and the like is masked and stored, and the data is decrypted and presented on the disclosure date or a message to the future can be delivered.

(Digital Diary)

Secret parts of photos, letters, voices, videos, music, and the like of digital diaries (including personal diaries, diaries to share private information with friends) or contact book websites that the user does not particularly show to anyone are subjected to masking processing, stored in a personal computer or a cloud server, and decrypted with a decryption key or password when necessary. Here, the poster is preferably able to change the password any time intentionally to prevent leakage to third parties. Further, a frame to input a password to temporally cancel masking for reading is provided. Entering the password to temporally cancel masking for reading temporarily shows the data only during operation. Moreover, for example, in the case where posted data is copied, even if it leaks, settings can be made so that it cannot be opened with a password. Settings can be made so that diaries or private information cannot be copied or a program that automatically erases the data after a certain period may be linked to the masking data. Furthermore, it can be used for business sharing websites. In this case, it is preferable to add encryption processing to increase security. Moreover, it is more preferable that the data be assigned with the device ID of a PC for specifying the PC on which the data is read or reproduced.

(Electronic Message Board)

Regarding electronic message boards to be published on the Internet, the online address and the like and the masking disclosure password of the message board are informed to the destination user. Photos, letters, voices, and videos are masked and the data is registered to the message board. It is advantageous also in making contact in case of emergency disasters.

(E-mails and Attached Files)

Strictly speaking, e-mail text and the attached files are one side of means for transmitting information that can be deciphered by the administrator of the e-mail service even if it is encrypted. In order to establish safer secret e-mail communication, a secret part of the e-mail text or the attached files is subjected to data masking processing and then transmitted. The password used for the receiver to decipher it is notified via a different communication line.

(Electronic Questionnaires and Electronic Voting)

Regarding answering to an electronic questionnaire, masking processing is performed on a privacy part, such as an address and a name, a voice and a photo, and a video, so that only required users can read or view the data. Thus, even if information about the electronic questionnaire leaks, the users feel safe about leakage of their information. It can also be used for electronic voting for handwriting-based elections. In the voting system in which the voter enters the name of a candidate by handwriting on ballot paper at the time of voting and it is entered through a compact scanner device and stored in a storage device, the image data reflecting the electronic vote may be subjected to entire masking, and at the time of electronic ballot counting, a dedicated software may be developed which cancels masking, checks OCR processing of handwriting and the image of the handwritten candidate name, and counts votes for each candidate, thereby achieving counting.

(Telop Turning in TV program)

In a TV program, a part of the presentation of the bulletin board is hidden by peelable paper and turning presentation is performed. It is presented on a tablet screen, a PC monitor, or the like as a digital bulletin board, or the like on which a secret portion is displayed as a different picture or image characters, and the images are sequentially peeled off on the touch panel screen according to the contents of the explanation. Further, if necessary, audio, video, or music files, are linked thereto, which provides effects of multimedia link which cannot be expressed on a traditional bulletin board. For example, concealment is achieved by previously preparing an overlap presentation part in which data overlaps the upper layer of the presentation of PDF data in the TV news or programs, and displaying the masking image or other related data. For image presentation and video reproduction, screen display processing is performed so that just the masking-sticker applied image part is turned, thereby generating (creating) the data in advance. During the show, a newscaster, for example, directly touches a masking data part presented on a large touch panel display or indirectly operates it for presentation through a compact touch display on hand. Upon an operation such that the masking image sticker is peeled off on a specific secret part of the screen, different reading PDF data is presented or a target video is reproduced on the inside (lower layer) of the peeled off image. Multiple images to be processed in such a manner that a sticker is peeled off may be layered, or a different image may be presented. This leads to not only reductions in the time and output cost for actually producing panels but also generation of a new expression effect.

(Masking Reference Book)

Regarding contents for reading or viewing of digital reference books, masking processing is performed to provide a digital reference book effective in answering or memorizing for learning, by masking a part to be memorized or by multi-masking it by adding a mask of hints to memorize for learning.

(Big-File Transfer Service)

There are big file transfer services in which the risk of information leakage from site administrator cannot be ignored. For this reason, big-file transfer data is masked and transmitted via a transfer service. By sending a decryption password separately to the destination, the security of the transfer file data is maintained.

(Addition of Information to Masking data)

For masked data, GPS positional information restriction may be set for limiting masking work or reading places. The GPS positional information and information about restriction limited to a reader's PC, for example, a reading licensee's PC (PC's ID) are attached to a part of masking data so that the position, reader's password, and PC's ID are verified for disclosure. In addition, reading is allowed only in a certain time zone, or Internet of Things (IoT) specific sensors (e.g., a temperature sensor, a motion sensor, or an ID card) notify the connected PC of their ON/OFF states. A command for sensing these sensors and editing, reading, or reproducing may be assigned to a part of the masking data and linked to the PC. In other words, editing and reading permission can be turned on or off only when a certain condition value is obtained. Aside from that, reading can be turned on or off under specific sensor conditions.

(Image or Video Processing of Masking Data)

Regarding a photo or a printed image, there is information to be concealed in a part of the photo or the printed image, and the part of the photo or the printed image has to be concealed to be read in some cases. In addition, between a print orderer and a printing company, there is an obligation of confidentiality of customer information, which allows only those in charge to see the information. Specialized workers other than those in charge regularly work on trimming of photos and images used for printing and online contents. In the case where those other than those in charge work on it, they selectively mask secret parts without impairing image trimming and conduct related work such as image trimming.

Aside from that, in videos, audio, music, and the like, there may be parts to be concealed until announcements or news reports related thereto are published. In this case, for edition of video, audio, music, and the like, the secret part is subjected to masking or reversible processing, such as blurring and blindfolding, or an audio part is subjected to voice changer processing or other reversible voice processing, and other secret parts are masked without impairing the editing work, and a specialized worker other than those in charge edits it. In the parts concealed at the time of publishing, cancelable masking, blurring, blindfolding, audio processing, or the like is canceled.

(1) Electronic Document Transmission and Online Proofreading (Electronic Document Transmission)

Figure 3:
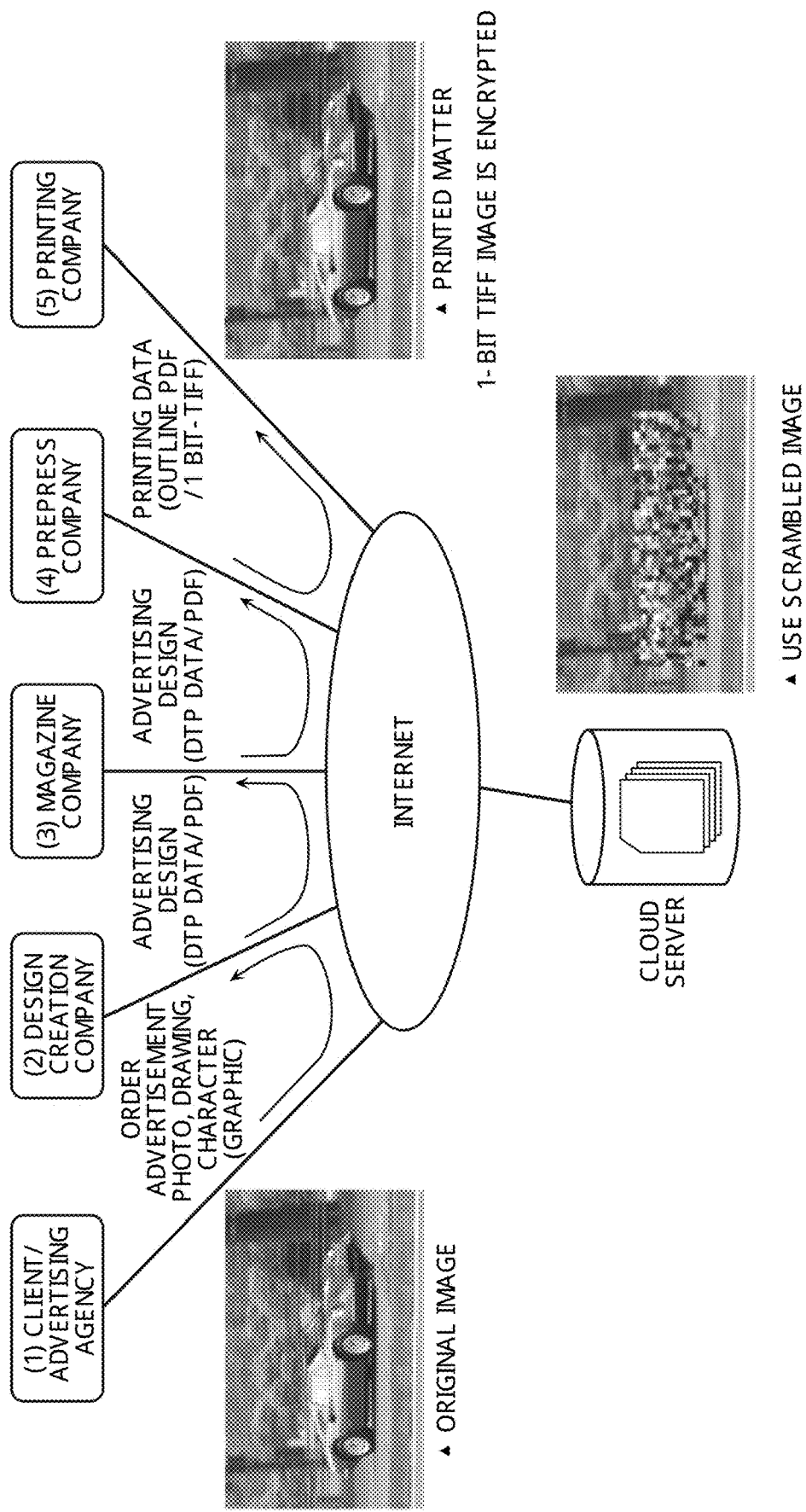
FIG. 3 is a system correlation diagram showing the overall configuration of a data masking system of the present invention when it is used in combination with the Internet.

FIG. 3 is a system diagram showing the outline of electronic document transmission operated in a one-direction process. Here, electronic document transmission is defined as "a document transmission data operation using a one-way process" between persons concerned. For example, it is an operation using a one-direction process between (1) a client or advertising agency, (2) a design creation company, (3) a magazine company, (4) a prepress company, and (5) a printing company, which are present upstream of an advertisement production flow among the parties related to magazine advertisements, newspaper advertisements, and the like. Here, a system is established in which even in the event of an information leakage of image data to be transmitted and received, preliminary masking processing of image data can prevent the leakage.

(2) Data Handled in Advertising Industry and Printing Industry (Online Proofreading)

Figure 4:
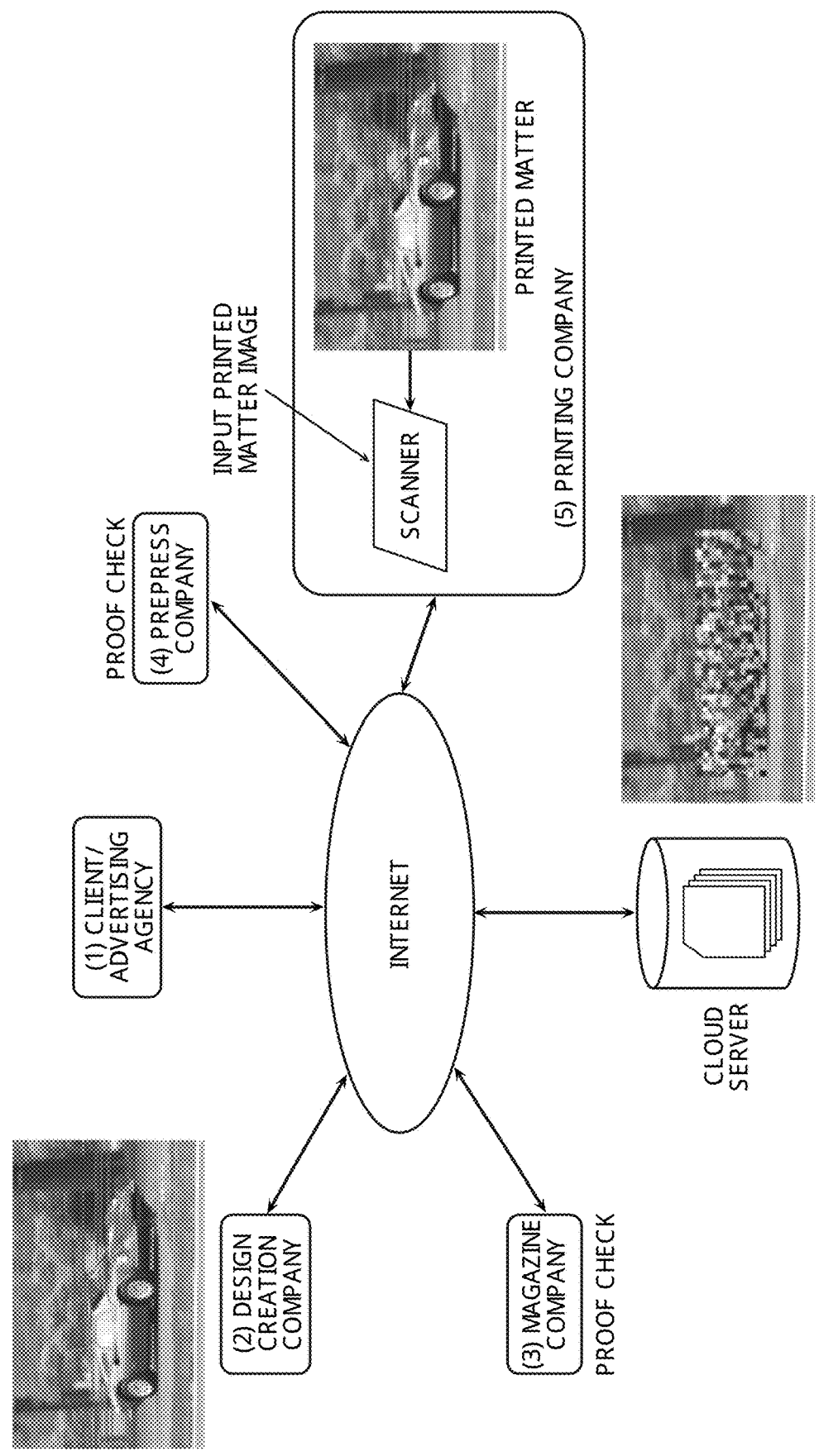
FIG. 4 is a system correlation diagram showing the overall configuration of a data masking system of the present invention when it is used in combination with the Internet.

FIG. 4 is a system diagram showing the outline of online proofreading electronic document transmission operated using a bidirectional process. Here, online proofreading is defined as "document transmission data operation using a bidirectional process" between persons concerned. The person in charge of print order and persons concerned mask particularly data or image data that must be concealed and not shown to a third party until completion of printing, set a password for concealment and reading, and transmits it to a person who needs it. For security reasons, it is preferable to change the password setting for concealment and reading every time between persons concerned.

It refers to, for example, a system in which persons concerned of a client, an advertising agency, a design company, and a printing company share advertisement documents or print proofreading image data stored on a server, and also share the information about proofreading instructions and its history. The final work of the online proofreading is the online final confirmation of the print matter immediately before printing. The print matter immediately before printing is input through a scanner or the like and the input image is transmitted to persons concerned as masking-processed printing data, and the person in charge of print order and persons concerned reconstruct the masking processing with a password and performs proof (final proofreading) checking. Proofreading and color proofing are input through an image input device, such as a camera or scanner of a character/dirt inspection or color proofing evaluation device, and a secret part is subjected to masking processing, assigned with a password to reconstruct it, and transmitted to the head office, design department, printing factory, and other facilities via the Internet.

The above-mentioned password is informed by a different phone line or, if possible, encrypted and transmitted by e-mail or other means. In each facility, the secret part is temporarily reconstructed with a decryption key or password, and character and dirt inspection and the resulting color evaluation are checked. If an abnormality is found, the secret part is subjected to masking processing again, the temporary reconstruction is cancelled, a changed password is entered as needed, and it is sent to a needed place via the Internet. For the password, the same one is used or a changed one is informed by a different phone line or e-mail or the like. A system is established in which even in the event of information divulgence of image data to be transmitted and received, such a function of temporarily reconstructing masking and encryption processing prevent the information leakage because this description key or password is unknown. Such safe online proofreading eliminates the physical movement of people and paper used for proofreading, and greatly reduces the manpower for printing, thereby providing great advantages for the print orderer and the printing company.

The data handled in the advertisement industry is desk top publishing (DTP) data which is so-called PostScript (PS) data. In the prepress printing industry, this DTP data is subjected to raster image-processing in an RIP device and then to conversion into the following two types of Tiff data (2) and (3) for printing. (Advertisement and design company) (1) PS data of a DTP design (prepress and printing company); (2) 8-bit Tiff data for print proofreading; (3) 1-bit 4-plate (C, M, Y, K) data for the output of printing plates; these advertising/printing data need to be safely transmitted and received and stored and operated.

(Inspection Just Before Printing)

In a prepress department of a printing company in which printing plate data is generated, rastar image processor (RIP) processing for converting the outline data generated in a printing DTP device into image data is performed. Subsequently, encryption processing of the color separation image data for printing of a 1-bit image obtained by RIP processing the print data is performed. In addition, masking processing of a secret area in the image data with about 200 to 400 dpi which is obtained by RIP processing the print data and used for inspection or color samples is performed. These two pieces of data are transmitted from the prepress department to the vicinity of the plate setter machine in the printing factory. Moreover, regarding the color sample image data, the secret part is reconstructed using a password at the printing factory, and proof print (also simply referred to as proof) is output. In addition, decryption processing of 1-bit color separation image data for printing is performed using a decryption key, and the plates output as printing plates are subjected to a printing machine to obtain a trial printed matter. These are compared for color inspection and character and dirt detection of the printing.

(Others)

The present invention may include many modifications and other operation examples other than the above-described embodiments and operation examples.

Figure 6:
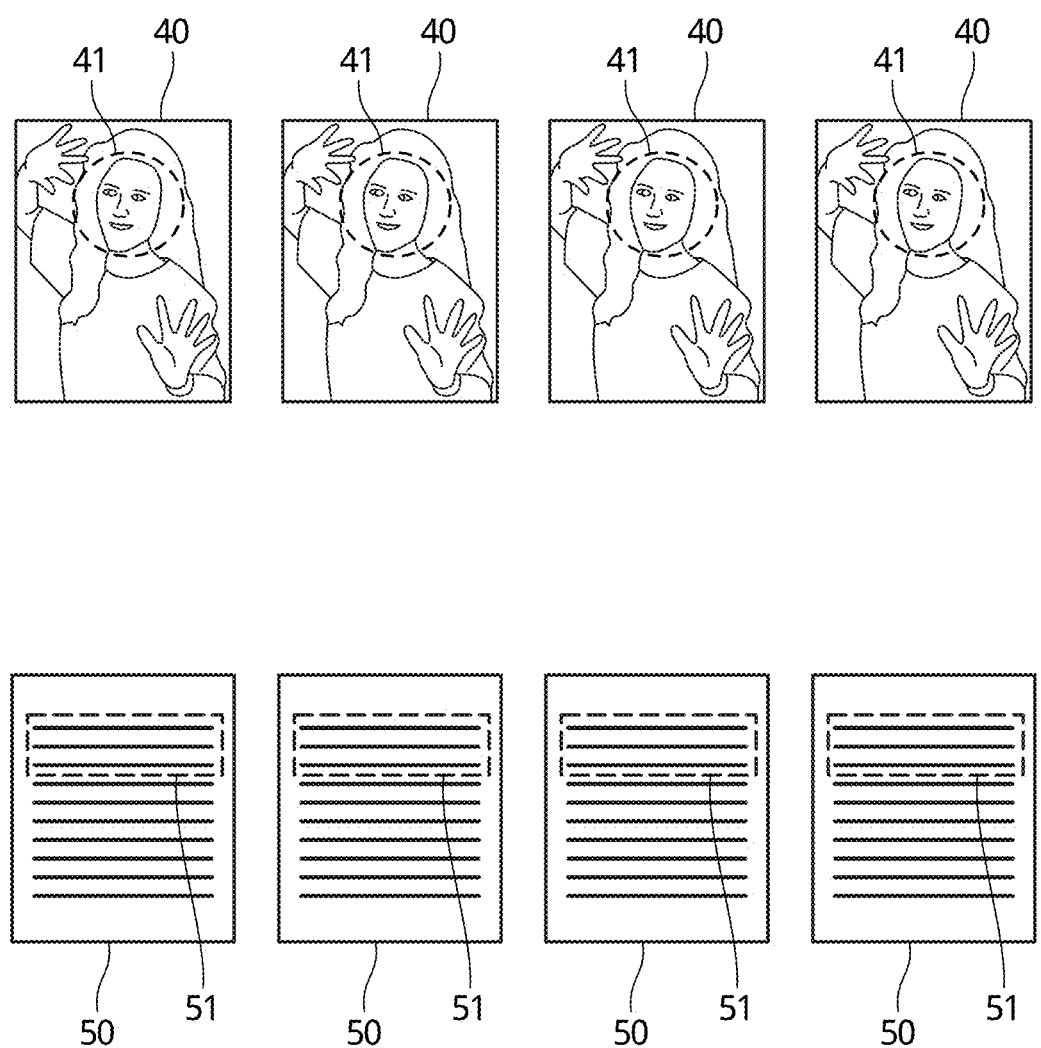
FIG. 6 is a diagram for explaining a secret region in the state where multiple pieces of secret target data exist.

As shown in FIG. 6, in the case where multiple pieces of secret image data 40(50) are present, there are secret target regions 41(51) that may be common to each piece of data. For example, when the data is image data 40 related to a person, the secret target region 41 may be a face portion of the person included in each piece of data. In the case where the data is document data 51 including personal information, the secret target region may be an upper region showing personal information such as an address or a name. Note that video data related to personal information of the person is treated in the same manner.

In the present system, even in such a case, a secret target region (common secret region) of each data can be set as appropriate, and appropriate encryption processing and masking processing can be applied. Note that the data to be concealed is an image or a document in FIG. 6; however, needless to say, this is not necessarily the case and the present invention is applicable to various types of data such as moving images, music, programs, and metadata. The common secret region is not limited to that shown in FIG. 6. For example, in the case of moving images or music, a certain time range from the start, a certain range of time from the arbitrarily set time, or the like can be freely set. Moreover, in the case of a document, words and phrases common to multiple pieces of data can be used as a common secret region.

Several embodiments have been described with reference to the drawings; however, the present invention is not limited to these embodiments, and components used in the embodiments can be combined or deleted for application. Similarly, the operation case of the present system is not limited to the ones described above, and, needless to say, the present system is applicable to various types of business that requires data encryption or masking.

(Notes)

A description will now be given of notes for matters related to the above-described embodiments, including those already mentioned. Pictures and patterns used in masking processing can be selected from a cloud server that provides at least a part of the functions of the present system or a group of template images registered to and stored in advance in the storage device of the worker. Examples of types of picture and pattern used in masking processing include, in addition to the types explained in above-described Examples and operation cases, striped patterns, checkers, center, squares, blur, waves, patterns/black paint/white erase, addition of dummy data, and photos, illustrations, pictures, patterns, and the like registered to the PC by the worker. As a method of masking, temporary simple quick processing is carried out. In other words, an arbitrary method is selected from the above-described types of mask processing and the data is processed by batch. After batch processing, it is temporarily cancelled for the data by using a password or decryption key, and selective masking processing is performed. At this time, the log of the masking processing is left.

For masking processing of input data using a scanner, when writing with a pen using an erasable ink, or a mark made using a seal or a temporary erasing marker (e.g., the mark disappears by air oxidation or by using another erasing material) is scanned, the corresponding part in the scanning data can be automatically subjected to masking processing.

Moreover, in order to provide a search function, a keyword is assigned to masking data. When the image data is PDF data, for example, the OCR function can also be used. This keyword can also be encrypted, and can be temporarily canceled with multiple passwords. After the data is stored in the final storage unit, the data output operation may require the password for the output, the password of the user who outputs the data, or the decryption key.

Regarding data for reading or viewing, dummy data may be added to the part subjected to masking processing or the unmasked part to be presented. The start date and time, the number of times of reading or viewing, the due date, copy, a limitation on reading or viewing of the output may be added to the data for reading or viewing. The data for reading or viewing may further have a function of allowing a response, i.e., the degree of interest of the reader or viewer to be written to it and a function of being sound recorded or video recorded. Regarding the data for reading or viewing, after a limited number of times of reading or viewing or the due date of reading or viewing, dummy data may be added to the image for reading or the image for viewing, and the image for reading or the image for viewing is shredded/fine-divided and re-arranged so that decryption is disabled without generating a decryption key and the data is erased.

REFERENCE SIGNS LIST

1 Data masking system
10, 40, 50 Secret target data
11, 21 Secret target region
20 Selective-masked data
30 Batch-masked data
41, 51 Common secret region

The invention claimed is:

1. A data masking method comprising:
converting a part including secret target information of all or part of first data including the secret target information, into second data for reading or viewing;
performing masking processing on the second data, thereby generating masking data;
storing the masking data;
outputting the stored masking data; and
selecting a secret target region including the secret target information included in the second data, wherein
the masking processing comprises:
  performing selective masking processing on the selected secret target region to generate the masking data;
  performing batch masking processing on the whole of the second data to generate batch masking data;
  temporarily storing the batch masking data; and
  canceling the batch masking processing of the temporarily stored batch masking data to reconstruct the second data, and
the selective masking processing is performed on the reconstructed second data.

2. The method according to claim 1, further comprising:
performing encryption processing on the first data, thereby generating encrypted data;
storing the encrypted data; and
outputting the stored encrypted data.

3. The method according to claim 2, further comprising linking the encrypted data and the second data.

4. The method according to claim 1, wherein
the second data is plural,
the batch masking processing is performed on all of the plurality of the second data, and
the selective masking processing is performed on part of the plurality of the second data.

5. The method according to claim 1, wherein
the second data is plural, and
the batch masking processing is commonly performed on a same region of each of the plural second data.

6. The method according to claim 1, wherein the canceling of the batch masking processing is applied to part of the second data.

7. The method according to claim 1, wherein
the masking processing generates third data obtained by canceling the batch masking processing and decryption,
the third data is subjected to the selective masking processing,
the third data is copied, and
the copied third data is inhibited from being output and stored.

8. The method according to claim 2, further comprising recording a history of the encryption processing and the masking processing.

9. The method according to claim 1, further comprising
requiring authentication when the masking data is output; and
receiving entering of an authentication key.

10. The method according to claim 2, further comprising assigning a search keyword to the encrypted data and the masking data.

11. The method according to claim 2, further comprising storing the encrypted data in a first storage media, and storing the masking data in a second storage media.

12. The method according to claim 1, wherein the masking data is temporarily decrypted with a decryption key so that the masking data returns to a masking state when a predetermined condition is satisfied.

13. The method according to claim 2, further comprising
outputting the encrypted data and the masking data to an external device via a network.

14. The method according to claim 2, wherein when both or one of the encrypted data and the masking data for reading or viewing is discarded as discarded data, nonperiodic data is added to the discarded data, the batch masking processing is performed on the discarded data, and the discarded data is subjected to data shredding processing that divides the discarded data into multiple pieces of data so that the discarded data becomes non-reconstructable, and is discarded.

15. The method according to claim 1, further comprising recording a history of and/or response to reading or viewing, when the outputted masking data is provided for reading or viewing.

16. The method according to claim 1, further comprising
designating a resolution when the second data is an image; and
designating a viewing accuracy when the second data is moving images or music.

* * * * *